(12) United States Patent
Diehl

(10) Patent No.: US 11,921,044 B2
(45) Date of Patent: Mar. 5, 2024

(54) INSPECTION ARRANGEMENT AND METHOD FOR FLUORESCENCE-BASED INSPECTION

(71) Applicant: BAUMER INSPECTION GMBH, Constance (DE)

(72) Inventor: Hans-Peter Diehl, Constance (DE)

(73) Assignee: BAUMER INSPECTION GMBH, Constance (DE)

( * ) Notice: Subject to any disclaimer, the term of this patent is extended or adjusted under 35 U.S.C. 154(b) by 0 days.

(21) Appl. No.: 17/720,325

(22) Filed: Apr. 14, 2022

(65) Prior Publication Data

US 2022/0334060 A1 Oct. 20, 2022

(30) Foreign Application Priority Data

Apr. 14, 2021 (DE) ...................... 10 2021 0019 55.5

(51) Int. Cl.
*G01N 21/64* (2006.01)
(52) U.S. Cl.
CPC ... *G01N 21/6456* (2013.01); *G01N 2021/646* (2013.01)
(58) Field of Classification Search
CPC ......... G01N 21/6456; G01N 2021/646; G01N 21/8422; G01N 21/8806
See application file for complete search history.

(56) References Cited

U.S. PATENT DOCUMENTS

| 5,097,135 | A | 3/1992 | Makino et al. |
| 5,363,854 | A | 11/1994 | Martens et al. |
| 6,081,740 | A | 6/2000 | Gombrich et al. |
| 6,584,342 | B1 | 6/2003 | Trushin et al. |
| 6,962,670 | B1 * | 11/2005 | Hanson .............. G01B 11/0658 264/40.6 |
| 2002/0014595 | A1 | 2/2002 | Sendai et al. |
| 2002/0026098 | A1 | 2/2002 | Kobayashi |
| 2002/0026099 | A1 * | 2/2002 | Adachi .............. A61B 1/00009 600/178 |
| 2002/0035330 | A1 | 3/2002 | Cline et al. |
| 2002/0105505 | A1 | 8/2002 | Sendai |

(Continued)

FOREIGN PATENT DOCUMENTS

| DE | 40 26 821 A1 | 3/1992 |
| DE | 40 26 564 C2 | 5/1993 |

(Continued)

*Primary Examiner* — David P Porta
*Assistant Examiner* — Mamadou Faye
(74) *Attorney, Agent, or Firm* — Norman B. Thot

(57) ABSTRACT

An inspection arrangement for fluorescence-based inspection of a product containing at least one fluorophore having an excitation spectrum and an emission spectrum, the inspection arrangement including a radiation source for generating a first electromagnetic radiation in a first wavelength range containing an excitation spectrum and a second electromagnetic radiation in a second wavelength range containing the emission spectrum, an imaging device for generating images of an inspection area in which the product can be arranged, and an image data processing device for image processing of the images. The inspection arrangement captures with the imaging device at least one fluorescence image of the inspection area irradiated with the first electromagnetic radiation and at least one reference image of the inspection area irradiated with the second electromagnetic radiation. The image data processing device generates a correction image based on the at least one fluorescence image and the at least one reference image.

10 Claims, 5 Drawing Sheets

(56) References Cited

U.S. PATENT DOCUMENTS

| | | |
|---|---|---|
| 2002/0161282 A1 | 10/2002 | Fulghum |
| 2002/0177780 A1 | 11/2002 | Sendai |
| 2004/0225222 A1 | 11/2004 | Zeng et al. |
| 2007/0212793 A1* | 9/2007 | Dejneka ............ G01N 21/6452 436/172 |
| 2010/0103250 A1 | 4/2010 | Ishihara |
| 2010/0177326 A1* | 7/2010 | Sakai ................ G01B 11/0625 356/632 |
| 2013/0317371 A1 | 11/2013 | Takei |
| 2016/0083848 A1* | 3/2016 | Chernyshov ............ C23C 22/56 148/241 |
| 2022/0011559 A1 | 1/2022 | Schmidt et al. |
| 2022/0211259 A1* | 7/2022 | Kuramoto ........ A61B 1/000094 |

FOREIGN PATENT DOCUMENTS

| | | |
|---|---|---|
| DE | 200 10 292 U1 | 10/2000 |
| DE | 203 01 286 U1 | 7/2003 |
| DE | 10 2004 006 960 A1 | 8/2005 |
| DE | 602 03 559 T2 | 2/2006 |
| DE | 600 24 059 T2 | 7/2006 |
| DE | 101 41 559 B4 | 1/2007 |
| DE | 102 01 005 B4 | 3/2007 |
| DE | 601 22 894 T2 | 3/2007 |
| DE | 601 23 884 T2 | 5/2007 |
| DE | 699 34 519 T2 | 9/2007 |
| DE | 601 30 170 T2 | 5/2008 |
| DE | 101 41 527 B4 | 1/2010 |
| DE | 10 2011 111 315 A1 | 2/2013 |
| DE | 10 2015 212 703 B3 | 7/2016 |
| DE | 10 2019 108 696 B3 | 8/2020 |
| EP | 1 180 660 A2 | 2/2002 |
| EP | 0 944 349 B1 | 6/2005 |
| EP | 1 868 159 A1 | 12/2007 |
| EP | 2 108 300 B1 | 10/2012 |
| EP | 2 724 658 A1 | 4/2014 |
| JP | 2001-153803 A | 6/2001 |

* cited by examiner

INSPECTION ARRANGEMENT AND METHOD FOR FLUORESCENCE-BASED INSPECTION

CROSS REFERENCE TO PRIOR APPLICATIONS

Priority is claimed to German Patent Application No. DE 10 2021 001 955.5, filed Apr. 14, 2021. The entire disclosure of said application is incorporated by reference herein.

FIELD

The present invention relates to an inspection arrangement and a method for fluorescence-based inspection of a product comprising at least one fluorophore, for example an industrial product, in particular a multilayer, multi-layer and/or laminated composite material or a product made of such composite material, e.g., but not exclusively flooring laminate.

BACKGROUND

In many areas of the manufacturing industry, optical inspection devices and corresponding inspection procedures are used with the aim of examining manufactured products for errors and defects. The procedure usually involves processing and evaluating images of the products to be inspected. The result of the respective evaluation is more reliable, the more the errors and defects in the images can be optically distinguished from impeccable areas of the products.

In some applications, special optical or spectral properties are exploited to better indicate the defects and flaws in the images. For example, fluorescence-based inspection devices and methods are used for products containing fluorophores, fluorochromes, or other types of fluorescent carriers. Specifically, fluorescence-based inspection involves evaluating images of the products excited to fluoresce, based on the primary illumination effects caused. Under certain circumstances, however, other areas of the products that are irrelevant to the inspection are indicated in the image captures in addition to the defects and flaws during fluorescence. As a result, defects and flaws may not be detected or flawless areas of the products may be incorrectly classified as defective. This inevitably leads to losses in quality, productivity and/or efficiency.

SUMMARY

An aspect of the present invention is to provide means that allow for the performance of fluorescence-based inspections with increased detection accuracy.

In embodiments, the present invention provides an inspection arrangement for fluorescence-based inspection according to claim 1 and a method for fluorescence-based inspection according to claim 9.

BRIEF DESCRIPTION OF THE DRAWINGS

The present invention is described in greater detail below on the basis of embodiments and of the drawings in which.

DETAILED DESCRIPTION

Figure 1:
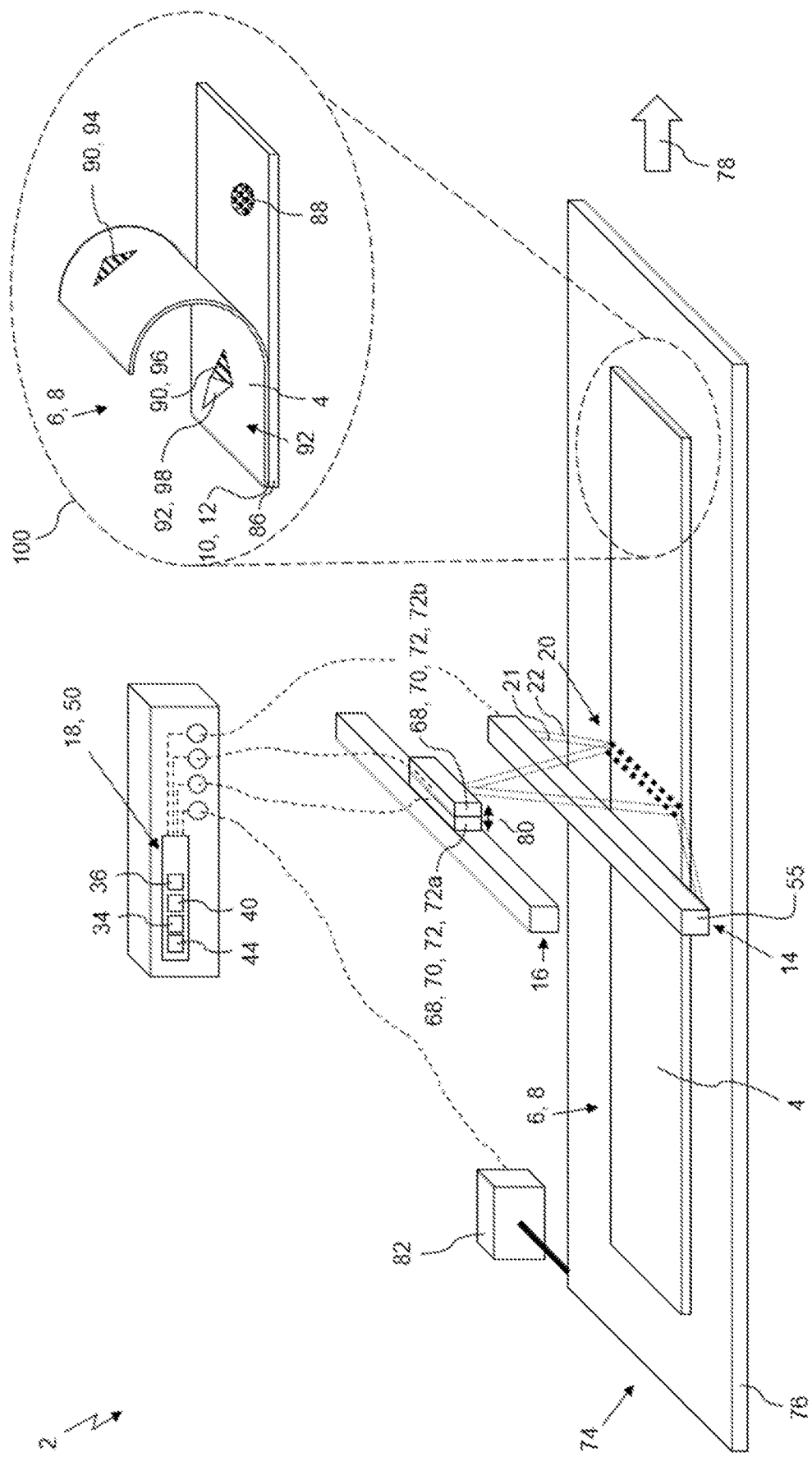
FIG. 1 shows a schematic representation of an inspection arrangement with an inspection arrangement according to a first exemplary embodiment.

The present invention is advantageous because the at least one fluorophore can be excited to fluoresce by irradiating the inspection area with the first electromagnetic radiation containing the excitation spectrum. Thus, the optical properties of the at least one fluorophore are imagable in the at least one fluorescence image and can be exploited accordingly for fluorescence-based inspection.

Undesired secondary illumination effects, which are caused by the at least one fluorophore in the emission spectrum, are also imaged in the at least one fluorescence image and highlight areas of the product that are irrelevant for the inspection, can be imitated by irradiating the inspection area with the second electromagnetic radiation containing the emission spectrum and thus be specifically reproduced in the at least one reference image. Advantageously, this allows the secondary illumination effects to be factored out when generating the correction image, so that they are no longer visible or at least only visible in a reduced form in the correction image. Thus, the fluorescence-based inspection can be performed with increased detection accuracy using the correction image.

The method according to the invention also benefits from the advantages already mentioned. In particular, with the method according to the invention, secondary illumination effects caused by the at least one fluorophore, which are mapped in the at least one fluorescence image, can be specifically reproduced in the at least one reference image and can thus be extracted when generating the correction image. This will be explained in more detail below.

The excitation spectrum and the emission spectrum of the at least one fluorophore are known or predefined depending on the application. Here, the excitation spectrum may represent a continuous excitation wavelength range or a discrete excitation wavelength. The emission spectrum may in turn represent a continuous emission wavelength range or a discrete emission wavelength.

The solution according to the invention can be further improved by various designs, each is advantageous in itself and can be combined with one another as desired. These embodiments and the advantages associated with them are discussed below. The features described below can be used, even if this is not explicitly noted, both for the process according to the invention and for the apparatus according to the invention. So, a method feature that is explicitly described only in the context of the method may also constitute a device feature. Conversely, a device feature that is only described in the context of the device may also represent a method feature.

In this context, a device, equipment, module, block or unit may correspond to a process step or a function of a process step. Similarly, aspects described in the context of a process step also represent a description of a corresponding block, module, device, unit or feature thereof. The advantages described with respect to the device apply equally to the process according to the invention and vice versa.

According to a first possible embodiment of the inspection arrangement according to the invention, the image data processing device may be configured to generate the correction image by difference formation from the at least one fluorescence image and the at least one reference image.

Accordingly, according to a possible embodiment of the method according to the invention, the correction image can be generated by formation of differences from the at least one fluorescence image and the at least one reference image. This represents an easily implementable possibility for generating the correction image. In particular, the image data processing device may comprise a subtraction module for performing the difference formation. The subtraction module can be designed to subtract pixel by pixel the color values or brightness values from the image data of the at least one fluorescence image and the at least one reference image and to provide the respective result as a color value or a brightness value of the associated pixel of the correction image.

To increase accuracy, geometry adjustment and/or contrast adjustment can be performed between the at least one fluorescence image and the at least one reference image prior to the formation of differences. For this purpose, the image data processing device can comprise a geometry adjustment module and/or a contrast adjustment module. The geometry adjustment module can be configured to align the at least one fluorescence image and the at least one reference image mutually congruently or at least approximately congruently. The contrast adjustment module may in turn be configured to mutually align or at least approximately align the contrast ratios of the at least one fluorescence image and the at least one reference image.

For the purpose of automating the fluorescence-based inspection, the image data processing device can be designed to perform a, preferably automatic, shape recognition in the correction image. For this purpose, the image data processing device can comprise a shape recognition module.

The shape recognition module can be designed to compare the pixels of the correction image on the basis of their color values or brightness values with a predefined limit value and to categorize them according to whether they fall below or exceed the limit value. Furthermore, the shape recognition module can be designed to group pixels, that are adjacent to each other, with the same category into pixel groups.

In addition, the shape recognition module can be configured to identify pixel groups of a certain minimum size and recognize them as a shape.

In addition to the so-called threshold value method, which has just been described by way of example, other methods or algorithms known from the state of the art can of course also be used for shape recognition.

The image data processing device as well as its components, i.e., the subtraction module, the geometry adjustment module, the contrast adjustment module and/or the shape recognition module, may be implemented independently of each other by hardware and/or software, in particular by computer-implemented methods. The image data processing device, for example, can be implemented as an image data processor.

According to another possible embodiment, the first wavelength range may located outside the emission spectrum of the at least one fluorophore. In other words, the first wavelength range does not overlap with the emission spectrum of the at least one fluorophore. Thus, it can be ensured that the first electromagnetic radiation does not contribute to the occurrence of the aforementioned secondary illumination effects. Consequently, the secondary illumination effects are occur as weakly as possible in the at least one fluorescence image.

To ensure that the fluorescence of the at least one fluorophore occurs as less as possible in the at least one reference image, the second wavelength range is preferably outside the excitation spectrum of the at least one fluorophore. Means, the second wavelength range does not overlap with the excitation spectrum of the at least one fluorophore.

The inspection arrangement can be designed to irradiate the inspection area with the first electromagnetic radiation and with the second electromagnetic radiation by means of the radiation source. The respective irradiation is preferably time-delayed. For example, the radiation source can comprises two different emitters or light sources for this purpose, of which the first emitter is designed to generate the first electromagnetic radiation and the second emitter is designed to generate the second electromagnetic radiation.

According to the invention, the first radiator is designed as a UV lamp, UV light or black light lamp. According to the invention, the first electromagnetic radiation is UV-A radiation. Thus, a wide variety of fluorophores can be excited. Of course, the present invention is not limited to UV-A radiation and may utilize other types of radiation depending on the application.

The second emitter can be designed as a polychromatic LED, as a color LED, in particular as a blue light LED. The second emitter is preferably a narrow-band lamp or luminaire, in particular a monochromatic lamp or luminaire, which generates light with the wavelength of the emission spectrum. Thus, illumination conditions can be created in the at least one reference image that are comparable to the illumination conditions of the at least one fluorescence image.

The first emitter and/or the second emitter can be respectively designed as a flash light. Alternatively, the first spotlight and/or the second spotlight can be designed to radiate continuously in the direction of the inspection area. Accordingly, the device is configured to dim the first emitter and/or the second emitter as required.

According to a space-saving embodiment, the radiation source may also comprise a single controllable emitter, such as a controllable LED, configured to generate the first electromagnetic radiation and the second electromagnetic radiation, respectively.

According to a further embodiment, the radiation source can also have several individual emitters and/or controllable emitters. These can advantageously irradiate the inspection area from two directions. This would have the advantage that homogeneous illumination can be achieved.

According to another possible embodiment, the first wavelength range is not included in the at least one fluorescence image. Thus, the at least one fluorophore is more visible in the at least one fluorescence image, since no superposition with the first electromagnetic radiation occurs. For this purpose, the device may, for example, comprise a filter between the inspection area and the imaging device, which is configured to block the first wavelength range and/or to enable only the second wavelength range to pass, preferably the emission spectrum.

In particular, the filter may include appropriate optical filters, i.e., band-elimination or band-stop filters and/or band-pass or bandwidth filters. Alternatively or additionally, a sensitivity of the imaging device may be limited to the second wavelength range. This sensitivity restriction can be implemented in the imaging device on the hardware side and/or on the software side.

To prevent superposition with ambient light, the at least one fluorescence image and/or the at least one reference image can be generated under complete or partial shielding of ambient light. For this purpose, the device may optionally comprise a light shielding device for darkening or at least obscuring the inspection area. Alternatively, the device may also have a darkroom.

The imaging device, for example, can comprise a single camera, in particular a fluorescence camera, for generating the images. Of course, the imaging device can also comprise two different cameras.

Advantageously, the imaging device is designed to repeatedly perform the generation of the images. Accordingly, the image data processing device is also capable of repeated image processing of the images. Thus, several products can be inspected one after the other and/or products whose spatial extent exceeds the inspection area can be inspected piece by piece.

Particularly suitable for the inspection of multiple and/or elongated products is an embodiment of the inspection arrangement that includes a conveyor device, for example a conveyor belt, for moving the product through the inspection area. In particular, this enables a continuous relative movement between the product and the imaging device. The images can be generated during this continuous relative movement. Thus, high inspection speeds can be achieved. In other words, based on the continuous relative movement, several products and/or several partial areas of a product can be inspected in a shorter time in the moving state.

In addition or alternatively, the imaging device can be designed as a linescan camera. This enables endless images of the product, so that products of any length can be inspected. The linescan camera is moved continuously relative to the product. This relative movement can take place by means of the conveyor device and/or by moving the linescan camera itself. The imaging device can be designed to generate the images during this relative movement.

According to another possible embodiment, the inspection arrangement is configured to acquire the at least one fluorescence image and the at least one reference image pixel-synchronously. In other words, for each pixel in the at least one fluorescence image, there is a corresponding pixel in the at least one reference image that images the same location of the inspection area, and vice versa. This increases the accuracy of the inspection arrangement and method according to the invention, particularly with respect to the generation of the correction image.

To achieve pixel synchronicity with continuous relative movement, the imaging device comprises two linescan cameras spaced apart or arranged next to each other. The inspection area is irradiated alternately with the first electromagnetic radiation and the second electromagnetic radiation and is recorded alternately with the two linescan cameras in each case, with the imaging frequency of the two linescan cameras being set up in such a way that a time interval between two successive images corresponds to the quotient of the spatial distance between the two linescan cameras and the feed rate of the conveyor device.

Pixel synchronicity can also be achieved if, instead of the two linescan cameras spaced apart from each other, a multiline linescan camera or a matrix camera is controlled line by line or multiline, with the distance between the controlled lines of the matrix camera being calculated in the above quotient instead of the distance between the two linescan cameras.

Preferably, the conveyor device can have a rotary encoder that specifies a clock rate to which the imaging frequency of the one or two cameras can be adapted.

In order to avoid motion blur in the at least one fluorescence image and the at least one reference image, the product can remain motionless within the scope of the method according to the invention, at least during the respective imaging. This also makes it easy to achieve pixel synchronicity between the at least one fluorescence image and the at least one reference image. Preferably, the imaging device in this embodiment is designed as a matrix camera. When inspecting several products, these can be moved discontinuously into the inspection area, e.g., with the conveyor device, and remain static in the inspection area for a certain retention time in each case. The respective images are generated within this retention time.

To prevent the first electromagnetic radiation from overlapping with the second electromagnetic radiation in the images, the imaging of the at least one fluorescence image and the at least one reference image in the method according to the invention can be time-shifted and/or location-shifted.

The inspection arrangement according to the invention is suitable for an article which is constructed from a plurality of layers or plies, wherein one layer contains the at least one fluorophore. The article of manufacture, for example, may be an industrial article, in particular a multi-layer, multi-coating and/or laminated composite or an article made of such composite, e.g., but not limited to one or more flooring laminates.

For better understanding, the layer containing the at least one fluorophore is hereinafter referred to as the "fluorophore layer," although this layer need not consist entirely of the at least one fluorophore and may have other components in addition to the at least one fluorophore.

Especially, the inspection arrangement according to the invention makes it possible to reliably detect defects (such as holes, cracks, detachments and/or folds) in the fluorophore layer while minimizing the disturbing influence of secondary illumination effects. Thus, the quality of the product, especially with regard to the fluorophore layer, can be reliably tested without the secondary illumination effects distorting or influencing the result.

The secondary illumination effects can specifically be images of patterns, decors, logos, inscriptions and/or other markings which are located, for example, on a layer of the product directly or indirectly adjacent to the fluorophore layer, are illuminated by the fluorophore layer during fluorescence and therefore appear together with the defects in the at least one fluorescence image. From the at least one fluorescence image alone, a detection of the defects, in particular a differentiation from the patterns, decors, logos, inscriptions and/or other markings is correspondingly difficult. Therefore, according to the invention, the patterns, decors, logos, inscriptions and/or other markings are also specifically made visible in the at least one reference image. The defects, on the other hand, are only depicted in the at least one fluorescence image. Thus, the patterns, decors, logos, inscriptions and/or other markings can be eliminated during the generation of the correction image, while the defects are transferred into the correction image.

The inspection arrangement according to the invention and also the method according to the invention are thus suitable, among other things, for the quality testing of flooring laminates as long as a laminate layer contains the at least one fluorophore. Consequently, the method according to the invention can in particular be a quality testing method for such flooring laminates.

To ensure irradiation of the fluorophore layer, the fluorophore layer may be an uppermost and/or outermost layer of the article. Alternatively, there may be any number of layers transparent to the first electromagnetic radiation and the second electromagnetic radiation between the fluorophore layer and the radiation source. Preferably, the fluorophore layer is located between the radiation source and a layer of the article reflecting the first electromagnetic radiation and the second electromagnetic radiation.

In the following, the invention is explained in more detail by way of example with reference to the drawings. The combination of features exemplified in the embodiments shown can be supplemented by further features in accordance with the above explanations, depending on the properties of the inspection arrangement according to the invention and/or the method according to the invention that are necessary for a particular application. Also, likewise in accordance with the above explanations, individual features may be omitted from the embodiments described if the effect of this feature in a specific application is not important. In the drawings, the same reference signs are always used for elements of the same function and/or the same structure.

The structure and function of an inspection arrangement 2 according to the invention are described below by way of examples with reference to FIGS. 1 to 5. Although some aspects of the invention are described only in the context of the inspection arrangement 2, it is of course possible that these aspects also represent a description of the corresponding process, wherein, for example, a block, a module, a unit, a device or a feature of the inspection arrangement 2 corresponds to a method step or a function of a method step. Similarly, aspects described in the context of a method step also correspondingly represent a description of a block, a module, a unit, a device or a property of the inspection arrangement.

In FIG. 1, a simplified schematic representation of an exemplary embodiment of the inspection arrangement 2 is shown. The inspection arrangement 2 is provided for fluorescence-based inspection of a product 6 comprising at least one fluorophore 4. In this context, the at least one fluorophore 4 has a known or predefined excitation spectrum and a known or predefined emission spectrum, depending on the application. The excitation spectrum may represent a continuous excitation wavelength range or a discrete excitation wavelength. The emission spectrum may in turn represent a continuous emission wavelength range or a discrete emission wavelength.

As shown in FIG. 1, the inspection arrangement 2 includes, among other things, a radiation source 14, an imaging device 16, and an image data processing device 18.

The imaging device 16 serves to generate image images 24 of an inspection area 20 in which the product 6 is arrangeable and/or arranged.

The radiation source 14 is for generating a first electromagnetic radiation 21 and a second electromagnetic radiation 22. The first electromagnetic radiation 21 has a first wavelength range including the excitation spectrum of the at least one fluorophore 4. The second electromagnetic radiation 22 has a second wavelength range containing the emission spectrum of the at least one fluorophore 4. The first wavelength range is preferably outside of, and thus does not overlap with, the emission spectrum. The second wavelength region is preferably outside the excitation spectrum, so that they do not overlap with each other.

As further shown in FIG. 1, the radiation source 14 may comprise a single controllable emitter 55, such as a controllable LED, configured to generate the first electromagnetic radiation 21 and the second electromagnetic radiation 22, respectively.

Figure 2:
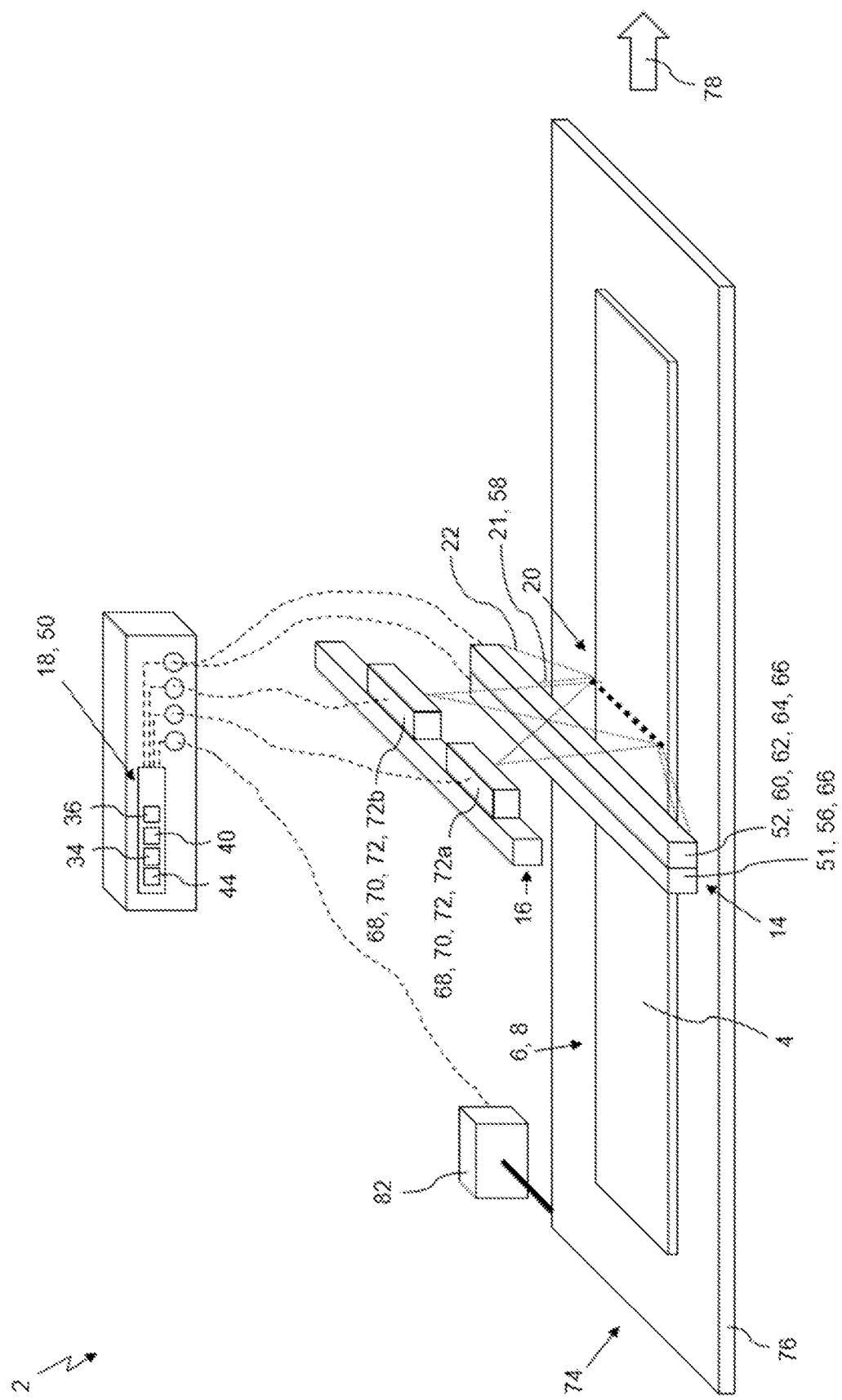
FIG. 2 shows a schematic representation of an inspection arrangement with an inspection arrangement according to a second exemplary embodiment.

In FIG. 2, an alternative embodiment is shown in which the radiation source 14 comprises a first emitter 51 and a separate second emitter 52, wherein the first emitter 51 is configured to generate the first electromagnetic radiation 21 and the second emitter 52 is configured to generate the second electromagnetic radiation 22. For example, the first radiator 51 may be configured as a UV lamp 56. Accordingly, the first electromagnetic radiation 21 may be UV-A radiation 58.

The second radiator 52 may be configured as a polychromatic lamp or a narrow-band lamp 60, in particular a monochromatic lamp 62, more specifically a color lamp 64, for example a blue light lamp, which generates light with the wavelength of the emission spectrum.

The first emitter 51 and the second emitter 52 are each configured as a flashlight 66 in the embodiment shown in FIG. 2. Alternatively, the first emitter 51 and/or the second emitter 52 may continuously shine in the direction of the inspection area 20 and be alternately dimmed.

Figure 3:
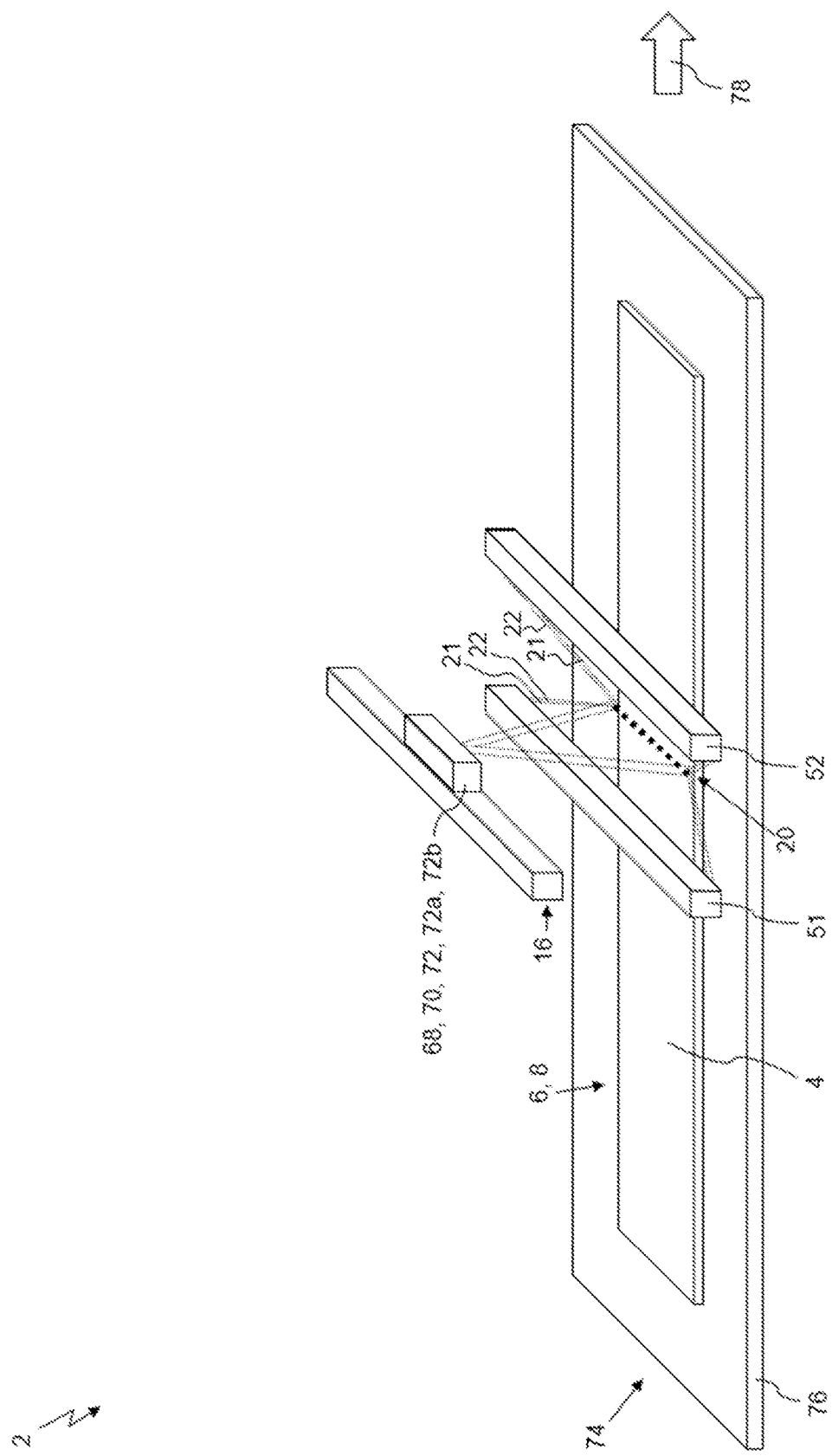
FIG. 3 shows a schematic representation of an inspection arrangement with an inspection arrangement according to a third exemplary embodiment.
Figure 4:
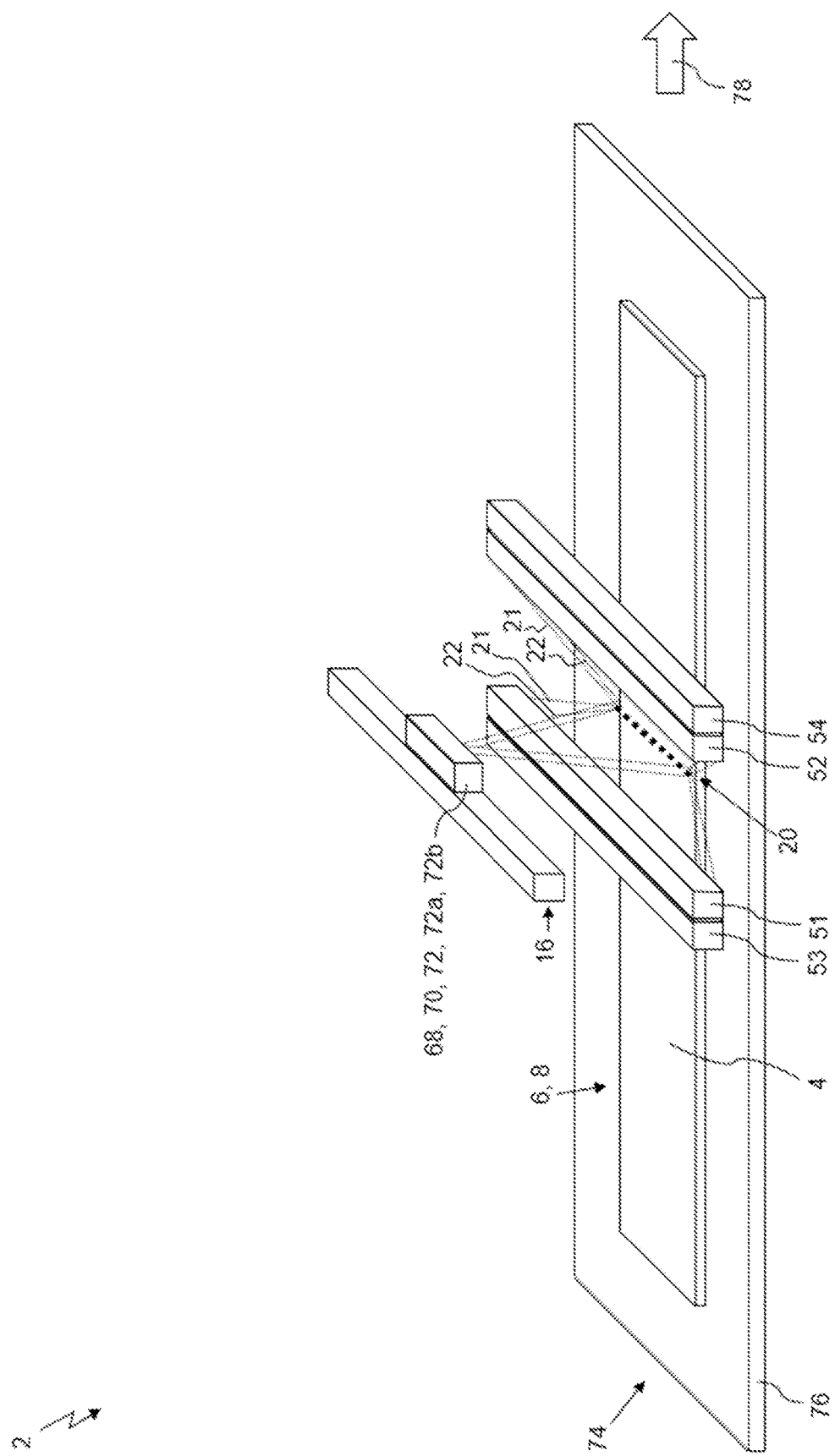
FIG. 4 shows a schematic representation of an inspection arrangement with an inspection arrangement according to a fourth exemplary embodiment.

In another embodiment shown in FIG. 3, the first emitter 51 and the second emitter 52 are arranged at a distance from each other and illuminate the inspection area 20 from two sides. Both electromagnetic radiations 21 and 22 are available in both the first radiator 51 and the second radiator 52. In an alternative arrangement (not shown), only the first electromagnetic radiation 21 can be made available in the radiator 51 and only the second electromagnetic radiation 22 can be made available in the radiator 52. In another embodiment shown in FIG. 4, two additional radiators 53 and 54 are provided in addition to the first radiator 51 and the second radiator 52. Radiator 51 and radiator 52 provide the first electromagnetic radiation 21 whereas radiator 53 and radiator 54 provide the second electromagnetic radiation 22.

Figure 5:
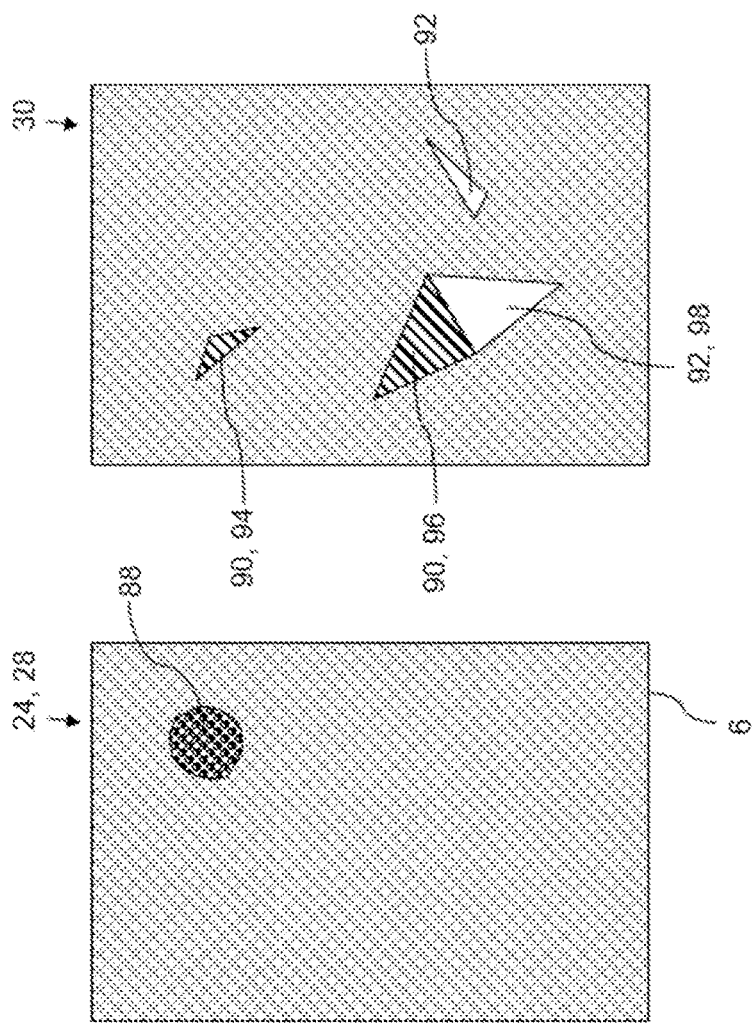
FIG. 5 shows a schematic representation of a fluorescence image, a reference image and a correction image.
Figure 5:
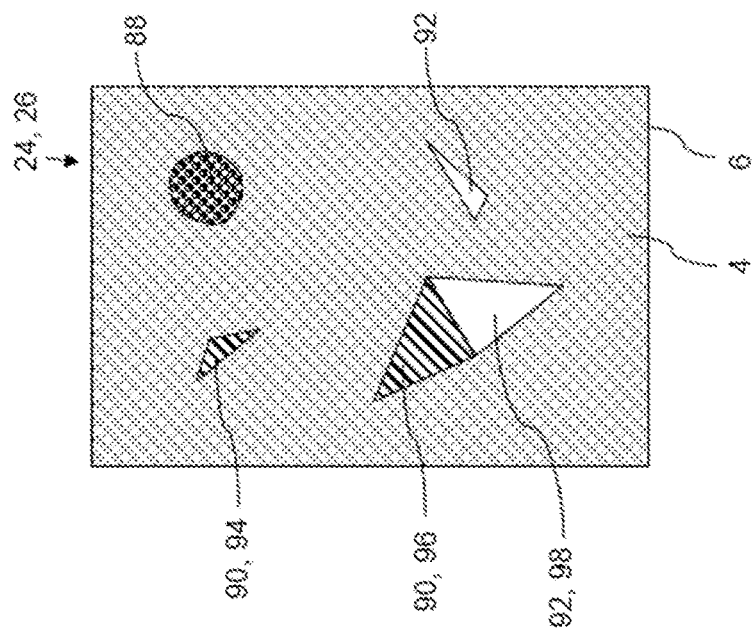

Accordingly, the inspection arrangement 2 is configured to irradiate the inspection area 20 with the first electromagnetic radiation 21 and to capture at least one fluorescence image 26 of the inspection area 20 irradiated with the first electromagnetic radiation 21 using the imaging device 16 (see FIG. 5). Furthermore, the inspection arrangement 2 is configured to irradiate the inspection area 20 with the second electromagnetic radiation 22 and to capture with the imaging device 16 at least one reference image 28 of the inspection area 20 irradiated with the second electromagnetic radiation 22 (see FIG. 5).

Although in FIGS. 1 and 2 both the first electromagnetic radiation 21 and the second electromagnetic radiation 22 are shown, the respective irradiation with the first electromagnetic radiation 21 and the second electromagnetic radiation 22 preferably occurs with a time delay. Accordingly, the recording of the at least one fluorescence image 26 and the at least one reference image 28 is also time-shifted with respect to each other.

The imaging device 16 can, for example, comprise a single camera 68, in particular a fluorescence camera 70, or several cameras. The cameras 68 of the embodiments shown in FIGS. 1 and 2 are each configured as linescan cameras 72, 72a, 72b. In these embodiments, the inspection arrangement 2 further comprises a conveyor device 74, in particular a conveyor belt 76 for moving the product 6 through the inspection area 20. This enables a continuous relative movement 78 between the product 6 and the imaging device 16.

Alternatively or additionally, the imaging device 16 may be moved relative to the product 6.

As shown in FIG. 1, the imaging device 16 may include two linescan cameras 72a, 72b. The two linescan cameras 72a, 72b may be arranged side by side or spaced apart. Thus, the inspection area 20 can be irradiated alternately with the first electromagnetic radiation 21 and the second electromagnetic radiation 22 and thereby captured alternately with the two linescan cameras 72a, 72b in each case. Preferably, the capturing frequency of the two linescan cameras 72a, 72b is set up in such a manner that a time interval between two successive images corresponds to the quotient of the spatial distance 80 between the two linescan cameras 72a, 72b and the feed rate of the conveyor device 74. In this way, pixel synchronicity between the at least one fluorescence image 26 and the at least one reference image 28 can be achieved. Optionally, the conveyor device 74 may include a rotary encoder 82 that provides clocking for this purpose.

A sensitivity of the imaging device 16 may be limited on the hardware side and/or on the software side to the second wavelength range. Thus, with the embodiment shown, the first wavelength range is not imaged in the at least one fluorescence image 26.

Optionally, the inspection arrangement 2 may comprise a filter or filter device (not shown) between the inspection area 20 and the imaging device 16. The filter or filter device may be configured to block the first wavelength range and/or to allow only the second wavelength range, preferably the emission spectrum, to pass. In particular, the filter or filter device may comprise corresponding optical filters, i.e., band-stop filters and/or bandwidth filters.

Further optionally, the inspection arrangement 2 may comprise a light shielding device (not shown) for obscuring or at least darkening the inspection area 20. Alternatively, the inspection arrangement 2 may comprise a darkroom.

The image data processing device 18 is used for image processing of the image images 24, 26, 28. In particular, the image data processing device 18 is configured to generate a correction image 30 based on the at least one fluorescence image 26 and the at least one reference image 28 (see FIG. 5).

The correction image 30 can be generated, for example, by difference formation from the at least one fluorescence image 26 and the at least one reference image 28. For this purpose, the image data processing device 18 may comprise a subtraction module 34 for performing the difference formation. The subtraction module 34 can be configured to subtract the color values or brightness values from the image data of the at least one fluorescence image 26 and the at least one reference image 28 pixel by pixel and to output the respective result value as color value or brightness value of an associated pixel in the correction image 30.

Optionally, the image data processing device 18 may further comprise a geometry adjustment module 36 for performing geometry matching and a contrast adjustment module 40 for performing contrast matching. The geometry adjustment module 36 may be configured to align the at least one fluorescence image 26 congruently, or at least approximately congruently, with the at least one reference image 28. In turn, the contrast adjustment module 40 may be configured to mutually match or at least approximately match the contrast ratios of the at least one fluorescence image 26 and the at least one reference image 28.

Further, the image data processing device 18 may include a shape recognition module 44 for performing, preferably automatic, shape recognition in the correction image 30. The shape recognition module 44 may be configured to perform the shape recognition using a threshold method or another method or algorithm known in the prior art.

The image data processing device 18 as well as its components, that is, the subtraction module 34, the geometry adjustment module 36, the contrast adjustment module 40, and/or the shape recognition module 44 may be independently realized by hardware and/or software, in particular by computer-implemented methods. The image data processing device 18 is configured, for example, as an image data processor 50.

The operation of the inspection arrangement 2 according to the invention is explained below with reference to a specific application example.

The product 6 may be, for example, an industrial product composed of multiple layers or plies, in particular a multi-layer, multi-layer and/or laminated composite material or a product made of such composite material, for example, but not exclusively, a flooring laminate 8.

A layer 10 of the product 6 comprises the at least one fluorophore 4. For ease of textual understanding, the layer 10 comprising the at least one fluorophore 4 is hereinafter referred to as the fluorophore layer 12, although this layer 10 need not consist entirely of the at least one fluorophore 4 and may comprise other components in addition to the at least one fluorophore 4.

In the example shown in FIG. 1, the fluorophore layer 12 is shown as the uppermost and outermost layer of the product 6. However, the present invention is also applicable to articles in which there are other layers transparent to the first electromagnetic radiation 21 and the second electromagnetic radiation 22 on the fluorophore layer 12.

In the shown example of FIG. 1, the fluorophore layer 12 is located on a layer 86 of the product 6 reflecting the first electromagnetic radiation 21 and the second electromagnetic radiation 22, in particular the emission spectrum. Preferably, the fluorophore layer 12 is arranged in such a manner that it is located between the radiation source 14 and the reflective layer 86 and between the imaging device 16 and the reflective layer 86.

The reflective layer 86 may have markings, such as patterns, decorations, logos or inscriptions, which represent a flawless characteristic of the product 6. In FIG. 1, a marking 88 is indicated purely by way of example.

The fluorophore layer 12 may have unwanted imperfections 90, 92 that are not visible to the naked eye or conventional optical inspection measures due to the transparency and/or low layer thickness of the fluorophore layer 12. Such imperfections 90, 92 include, for example, holes 94 in the fluorophore layer 12 or detachments 96 and folds 98 of the fluorophore layer 12. This is shown in the magnification 100 in FIG. 1. Here, the fluorophore layer 12 is shown partially rolled up from the reflective layer 86 for differentiation purposes only.

As shown in FIG. 5 on the left, the voids 90, 92 can be made visible in the at least one fluorescence image 26, especially since voids 90 where the fluorophore layer 12 is interrupted do not fluoresce and voids 92 where the fluorophore layer 12 is doubled fluoresce differently than the rest of the fluorophore layer 12. In particular, the optical properties of the voids 90, 92 are clearly different from the rest of the fluorophore layer 12.

At the same time, however, the marker 88 also becomes visible in the at least one fluorescent image 26 because the fluorophore layer 12 produces secondary illumination effects when it fluoresces that cause the marker 88 to appear in the at least one fluorescent image 26.

Under certain circumstances, the difference between the defects 90, 92 and the marking 88 may not be distinct enough to make a reliable distinction, for example in the context of shape recognition.

According to the invention, therefore, the secondary illumination effects just mentioned are specifically readjusted in the at least one reference image 28. This succeeds in particular because the second wavelength range of the second electromagnetic radiation 22 contains the emission spectrum of the at least one fluorophore 4, and thus the illumination conditions that existed at the time of the occurrence of the secondary illumination effects can be simulated. Consequently, the marker 88 is also imaged in the at least one reference image 28.

As shown centrally in FIG. 5, the defects 90, 92 are not visible in the at least one reference image 28 because the second wavelength range preferably does not overlap with the excitation spectrum of the at least one fluorophore 4. In particular, when the at least one reference image 28 is acquired, no or at least very little fluorescence of the at least one fluorophore 4 is triggered, so that the defects 90, 92 do not appear or at least do not appear as clearly as in the at least one fluorescence image 26.

Consequently, when the correction image 30 is generated, the visibility of the marking 88 can be completely cancelled or at least reduced, while the visibility of the defects 90, 92 remains unchanged or at least decreases only slightly. This is shown on the right in FIG. 5.

With the aid of the inspection arrangement 2 according to the invention and with the aid of the method according to the invention, the correction image 30 can thus be generated in such a way that a more reliable detection of the defects 90, 92 is possible by eliminating the disturbing influence of the marking 88.

The present invention is not limited to embodiments described herein; reference should be had to the appended claims.

What is claimed is:

1. An inspection arrangement for a fluorescence-based inspection of a laminate product which is composed of a plurality of layers, one layer containing at least one fluorophore having an excitation spectrum and an emission spectrum, the inspection arrangement comprising:
   a radiation source for generating a first electromagnetic radiation in a first wavelength range containing the excitation spectrum of the at least one fluorophore, wherein the first radiation source is configured as a UV lamp, as UV light or as a black light lamp so that the first electromagnetic radiation is UV-A radiation, and a second electromagnetic radiation in a second wavelength range containing the emission spectrum of the at least one fluorophore;
   an imaging device for generating images of an inspection area in which the laminate product is arranged; and
   an image data processing device for image processing of the images,
   wherein,
   the inspection arrangement is designed to capture with the imaging device at least one fluorescence image of the inspection area irradiated with the first electromagnetic radiation, and to capture with the imaging device at least one reference image of the inspection area irradiated with the second electromagnetic radiation,
   the image data processing device is configured to generate a correction image based on the at least one fluorescence image and the at least one reference image;
   the first wavelength range does not overlap with the second wavelength range, and
   the generation by the radiation source of the first electromagnetic radiation does not occur simultaneously with the generation by the radiation source of the second electromagnetic radiation.

2. The inspection arrangement as recited in claim 1, wherein the image data processing device is configured to generate the correction image by calculating a difference between the at least one fluorescence image and the at least one reference image.

3. The inspection arrangement as recited in claim 1, wherein the image data processing device is configured to perform a shape recognition in the correction image.

4. The inspection arrangement as recited in claim 1, wherein the first wavelength range lies outside the emission spectrum of the at least one fluorophore.

5. The inspection arrangement as recited in claim 1, wherein the second wavelength range lies outside the excitation spectrum of the at least one fluorophore.

6. The inspection arrangement as recited in claim 1, wherein the second electromagnetic radiation is generated by a blue light lamp.

7. The inspection arrangement as recited in claim 1, further comprising:
   a conveyor device for moving the laminate product through the inspection area,
   wherein,
   the imaging device is configured as a line camera, as a multi-line line camera, or as a matrix camera in a line mode or in a multi-line mode.

8. The inspection arrangement as recited in claim 1, wherein the inspection arrangement is configured to capture the at least one fluorescence image and the at least one reference image pixel-synchronously.

9. A method for a fluorescence-based inspection of a laminate product which is composed of a plurality of layers, wherein a layer contains at least one fluorophore having an excitation spectrum and an emission spectrum, the method comprising the steps of:
   providing a radiation source for generating a first electromagnetic radiation in a first wavelength range containing the excitation spectrum of the at least one fluorophore, wherein the first radiation source is configured as a UV lamp, as UV light or as a black light lamp so that the first electromagnetic radiation is UV-A radiation, and a second electromagnetic radiation in a second wavelength range containing the emission spectrum of the at least one fluorophore;
   providing an imaging device for generating images of an inspection area in which the laminate product is arranged;
   providing an image data processing device for image processing of the image;
   positioning the laminate product in the inspection area;
   irradiating with the radiation source the inspection region with the first electromagnetic radiation containing the excitation spectrum of the at least one fluorophore;
   taking at least one fluorescence image of the inspection region irradiated with the first electromagnetic radiation containing the excitation spectrum of the at least one fluorophore with the imaging device;
   irradiating with the radiation source the inspection region with the second electromagnetic radiation containing the emission spectrum of the at least one fluorophore;
   taking at least one reference image of the inspection area irradiated with the second electromagnetic radiation containing the emission spectrum of the at least one fluorophore with the imaging device; and generating, via the image data processing device, a correction image based on the at least one fluorescence image and the at least one reference image, wherein, the first wavelength range does not overlap with the second wavelength range, and the irradiating with the first electromagnetic radiation does not occur simultaneously with the irradiating of the second electromagnetic radiation.

10. An inspection arrangement for a fluorescence-based inspection of a laminate product which is composed of a plurality of layers, one layer containing at least one fluorophore having an excitation spectrum and an emission spectrum, the inspection arrangement comprising:

a radiation source for generating a first electromagnetic radiation in a first wavelength range containing the excitation spectrum of the at least one fluorophore, wherein the first radiation source is configured as a UV lamp, as UV light or as a black light lamp so that the first electromagnetic radiation is UV-A radiation, and a second electromagnetic radiation in a second wavelength range containing the emission spectrum of the at least one fluorophore;

an imaging device for generating images of an inspection area in which the laminate product is arranged, the imaging device being configured as a line camera, as a multi-line line camera, or as a matrix camera in a line mode or in a multi-line mode;

an image data processing device for image processing of the images; and a conveyor device for moving the laminate product through the inspection area, wherein, the inspection arrangement is designed to capture with the imaging device at least one fluorescence image of the inspection area irradiated with the first electromagnetic radiation, and to capture with the imaging device at least one reference image of the inspection area irradiated with the second electromagnetic radiation, the image data processing device is configured to generate a correction image based on the at least one fluorescence image and the at least one reference image, and the inspection arrangement is configured to capture the at least one fluorescence image and the at least one reference image pixel-synchronously.

* * * * *